UNITED STATES PATENT OFFICE.

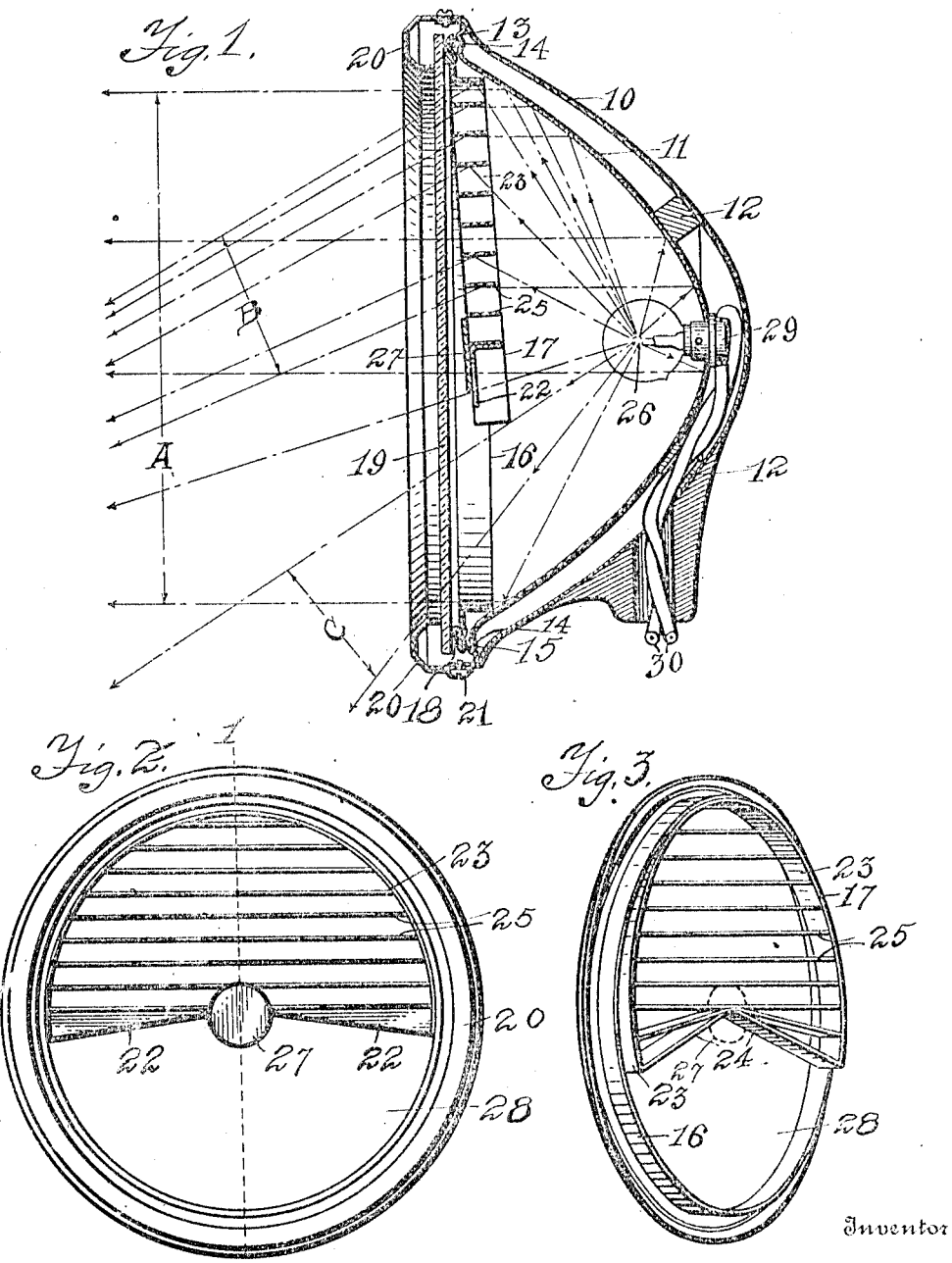

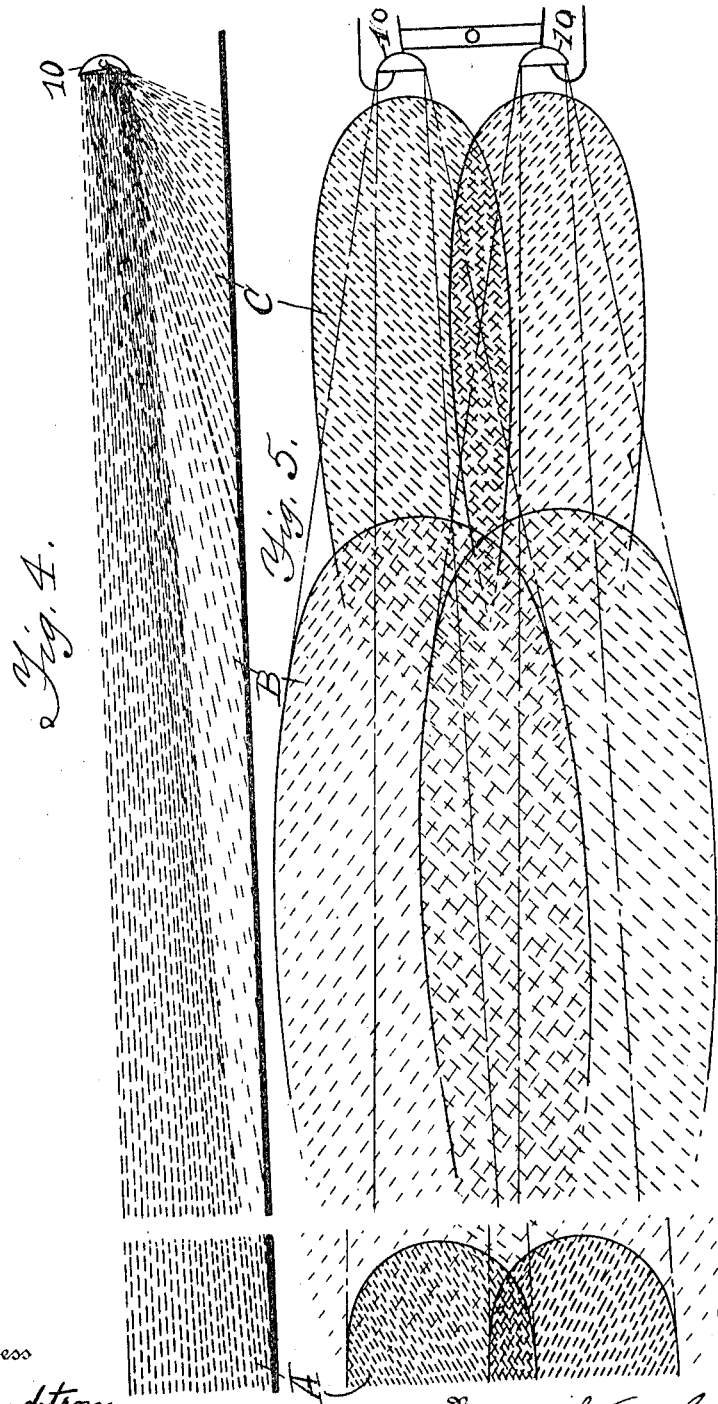

OTHO M. OTTE, OF JAMESTOWN, NEW YORK, ASSIGNOR TO RAYDEX MANUFACTURING COMPANY, OF BRACKENRIDGE, PENNSYLVANIA.

AUTOMOBILE-LAMP.

1,309,447.

Specification of Letters Patent.

Patented July 8, 1919.

Application filed January 3, 1918. Serial No. 209,906.

*To all whom it may concern:*

Be it known that I, OTHO M. OTTE, a citizen of the United States, residing at the city of Jamestown, in the county of Chautauqua and State of New York, have invented certain new and useful Improvements in Automobile-Lamps, of which the following, taken in connection with the accompanying drawings, is a specification.

The invention relates to lamps for vehicles and similar uses in which mechanism is provided to project and control the light; and the object of the improvement is to provide a lamp with a parabolic shaped deflector and to mount means within said parabolic shaped reflector for controlling the rays of light so that the field in front of said light is divided into three areas, namely, a distance area, an intermediate area and an area immediately in front of said light; said means consisting of a vision intercepting screen and reflector for the upper portion of the front of said parabolic shaped reflector, which screen-reflector is so constructed as to permit wide lateral reflection of the light rays and particularly in said intermediate area, which segmental screen-reflector is constructed with a series of horizontal spaced flat strips or bars having a slightly downward inclination toward the front of the reflector so that the direct rays of light and the reflected rays of light from the parabolic reflector which are intercepted by said flat downwardly inclined horizontal bars and are thrown on said intermediate area while the direct rays of light are thrown upon the area immediately in front of the lamp through the non-screened lower portion of the same; said flat parallel bars while intercepting the vision of the passerby or bystander do not intercept the comparatively small portion of the parallel rays of light reflected from the parabolic reflector and which are projected upon the distance area; and the invention consists in the novel features and combinations hereinafter set forth and claimed.

In the drawings, Figure 1 is a vertical sectional view at line 1—1 in Fig. 2 of the lamp with the screen-reflector mounted therein and showing the path of the projected rays of light by dotted lines to the different areas. Fig. 2 is a front elevation of the lamp showing horizontal screen-reflector in the upper portion. Fig. 3 is a rear perspective view of a modification of the vision protecting screen-reflector removed from the lamp. Fig. 4 is a side elevation diagram illustrating the projection of the light to the different light areas; and Fig. 5 is a plan diagram of the three light areas in the broad field of light in front of a pair of lamps, two of the areas having portions broken away to condense the views.

Like characters of reference refer to corresponding parts in the several views.

The numeral 10 designates the lamp or lamp casing, and the numeral 11 the parabolic reflector. The casing 10 is separated from the parabolic reflector 11 by means of a ring 12 near the rear portion of the lamp and an outwardly projecting flange 13 around the front rim of the reflector 11, the front edge of the casing 10 fitting over said outwardly projecting flange 13.

A groove 14 is provided in the flanged rim 13 to receive therein the packing 15 against which the supporting rim or ring 16 for the screen-reflector 17 rests. The rim or ring 16 also has a groove around therein to receive the packing 18 against which the glass cover 19 rests, all the parts being held in their proper relation to one another by means of the rim 20 which is attached to the projecting edge of the casing 10 by means of spaced screws 21.

The supporting rim or ring 16 for the screen-reflector 17 preferably has a cross bar 22 attached therein upon which the screen-reflector 17 is supported, though a slightly modified form is shown in Fig. 3 in which the outer supporting band 23 of the screen-reflector is extended across, being bent upwardly toward the center, as shown at 24, thereby providing the cross piece and a slight addition to the reflected rays of light, though the central horizontal rays of light do not accomplish as much as those above and below the same.

The vision protecting screen 17 consists of the outer band 23 and the thin horizontal sheet metal cross strips or bars 25 which are attached within the band 23 preferably by welding at spaced intervals which permit a wide reflection of the light through said screen yet do not permit the rays of light to pass upward through the same. The cross strips or bars 25 are given a slight downward inclination toward their front edges by attaching the assembled screen-reflector and particularly the band 23 within the rim or ring 16 at a slight inward angle toward the light 26. Said bars 25 are polished or coated so as to form reflecting surfaces which reflect the intercepted parallel rays of light from the parabolic reflector 11 downward upon the middle area in a broad flat shaft of light, though not nearly as strong as the shaft formed by the main parallel rays reflected from the parabolic reflector 11, or even the direct rays from the light 26 which shine downward immediately upon the roadway in front of the lamp. The vision of the passerby or bystander is protected from the main central beam of light by means of the shield plate 27 which is attached to the vision protecting screen 17 immediately in front of the light 26.

In the diagram shown in Figs. 4 and 5, the broad field in front of the pair of lamps 10 is divided into three overlapping areas A, B and C, portions of the areas A and B being broken away to bring the diagrams within the required dimensions for these drawings. The strength of the rays of light to these three areas are shown approximately by dotted lines. The areas A are farthest from the lamps, and the areas C are immediately in front of the lamps, while the areas B intervene between the areas A and C. As stated and shown, these areas overlap one another sufficiently to produce a comparatively even light, though the areas A are lighted much more strongly by the reflected parallel rays from the parabolic reflector than either the areas B or C and the areas C are lighted by the direct rays which pass through the open lower portion 28 of the lamp. The intermediate area B is lighted by the double reflected rays and the direct rays from the light 26.

The slight downward inclination of the vision protecting screen-reflector 17 causes its cross bars 25 to intercept a certain portion of the parallel rays which are reflected from the parabolic reflector 11 thereby giving said rays a second or double reflection downward upon the roadway in the intermediate area B assisting the direct rays of light in the illumination of said intermediate area. The strips 25 are made sufficiently thin to cause but slight obstruction of the rays of light and are placed sufficiently far apart to permit a wide clear lateral projection of the light thereby attaining the desired purpose of limiting the upward reflection but projecting a wide lateral field of light.

The light 26 is preferably an electric lamp in a suitable lamp post 29 with wire connections 30 to the source of electrical energy; the lamp 26 being adjustable in said holder so that it may be correctly adjusted as to position within the parabolic reflector 11 to reflect the rays of light in parallel alinement therefrom. The slight downward inclination of the strips 25 in the path of a predetermined portion of the parallel rays of light makes use of the sheen or luster quality of said strips and enhances their reflective qualities. The outwardly projecting flange of the rim or ring 16 being clamped between the glass 19 and the flange 14 of the reflector 11 acts to hold or support the rim or ring 16 and thereby the screen 17, without danger of rattling or breakage.

I claim as new:—

1. In combination with a parabolic reflector, a substantially semi-circular rim, and a series of spaced horizontal strips rigidly secured at their ends to the rim, the lowermost of said strips being bent upwardly at its center to provide an approximate inverted V-formation.

2. In combination with a parabolic reflector, a screen having a substantially semi-circular rim, and a series of spaced horizontal strips rigidly secured at their ends to the rim, the two lowermost of said strips being bent upwardly at their centers to provide an approximate inverted V-formation, the apices of the said V-strips being superimposed and the apex of the uppermost strip being engaged with the adjacent upper strip, said V-strips providing a cross-bar for the bottom of the screen and also affording an addition to the reflected rays of light.

In testimony whereof I have affixed my signature in the presence of two witnesses.

OTHO M. OTTE.

Witnesses:
H. T. SANDBERG,
I. E. NORDSTROM.